US010459286B2

(12) United States Patent
Kang et al.

(10) Patent No.: US 10,459,286 B2
(45) Date of Patent: Oct. 29, 2019

(54) DISPLAY DEVICE WITH QUANTOM RODS

(71) Applicant: SAMSUNG ELECTRONICS CO., LTD., Suwon-si (KR)

(72) Inventors: Min Woo Kang, Suwon-si (KR); Ki Hyung Kang, Suwon-si (KR); Joo-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/963,736

(22) Filed: Apr. 26, 2018

(65) Prior Publication Data
US 2018/0356682 A1 Dec. 13, 2018

(30) Foreign Application Priority Data

Jun. 8, 2017 (KR) .......... 10-2017-0071630

(51) Int. Cl.
G02F 1/1335 (2006.01)
G02F 1/13363 (2006.01)
(Continued)

(52) U.S. Cl.
CPC ......... G02F 1/133536 (2013.01); G02B 6/00 (2013.01); G02F 1/13363 (2013.01); G02F 1/133502 (2013.01); G02F 1/133617 (2013.01); G02F 1/137 (2013.01); G02F 1/133514 (2013.01); G02F 1/133615 (2013.01); G02F 2001/13706 (2013.01);
(Continued)

(58) Field of Classification Search
None
See application file for complete search history.

(56) References Cited

U.S. PATENT DOCUMENTS 9,104,062 B2 8/2015 Kim et al.
9,164,353 B2 10/2015 Jeon et al.
(Continued)

FOREIGN PATENT DOCUMENTS

KR 10-2013-0047199 A 5/2013
KR 10-2016-0028858 A 3/2016
KR 10-2016-0141231 A 12/2016

OTHER PUBLICATIONS

Search Report dated Sep. 7, 2018, issued by the International Searching Authority in International Application No. PCT/KR2018/005130.

Primary Examiner — James A Dudek
(74) Attorney, Agent, or Firm — Sughrue Mion, PLLC

(57) ABSTRACT

A display device including quantum rods is provided. The display device includes a light source generating light, a lightguide plate changing a path of the light generated from the light source and outputting the light to a front surface, a first polarizing plate arranged on top of the lightguide plate and generating first polarized light, a liquid crystal panel arranged on top of the first polarizing plate and displaying an image by using the first polarized light, a second polarizing plate arranged on top of the liquid crystal panel and generating second polarized light, and a quantum rod layer arranged on top of the second polarizing plate, divided into a plurality of pixels, and containing quantum rods in at least one of the pixels. A polarizing axis of the second polarized light is perpendicular to a polarizing axis of polarized light emitted by the quantum rod layer.

17 Claims, 13 Drawing Sheets

(51) Int. Cl.
   *G02B 6/00*   (2006.01)
   *G02F 1/137*   (2006.01)
(52) U.S. Cl.
   CPC ............ *G02F 2001/133531* (2013.01); *G02F 2001/133562* (2013.01); *G02F 2001/133638* (2013.01); *G02F 2201/38* (2013.01); *G02F 2202/108* (2013.01); *G02F 2202/36* (2013.01); *G02F 2413/01* (2013.01)

(56) References Cited

U.S. PATENT DOCUMENTS

| | | | |
|---|---|---|---|
| 2013/0242228 A1* | 9/2013 | Park | G02F 1/133617 349/61 |
| 2016/0209706 A1 | 7/2016 | Miki et al. | |
| 2016/0223870 A1* | 8/2016 | Miki | G02F 1/133617 |
| 2016/0320664 A1 | 11/2016 | Kang et al. | |
| 2017/0082892 A1* | 3/2017 | Chung | G02F 1/133514 |
| 2017/0123267 A1 | 5/2017 | Yanai et al. | |

* cited by examiner

100b

FIG. 11
100b
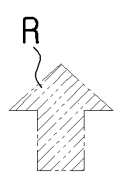R G B
| POLARIZING PLATE FOR REDUCING REFLECTION | ~190 |
| THIRD POLARIZING PLATE | ~180 |
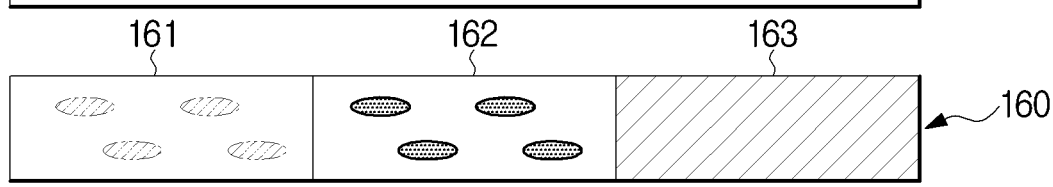
161  162  163  160
| SECOND POLARIZING PLATE | ~150 |
B B B

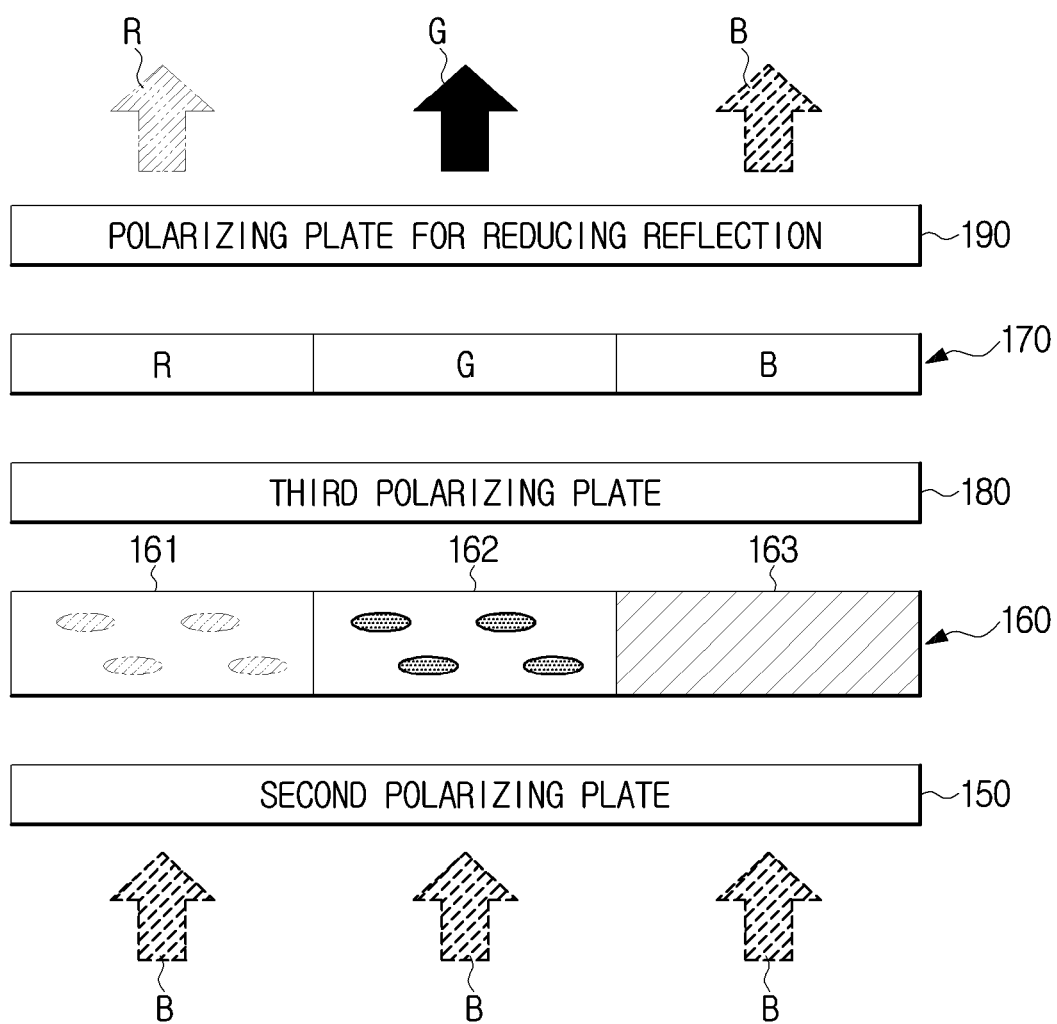

DISPLAY DEVICE WITH QUANTOM RODS

CROSS-REFERENCE TO RELATED APPLICATION

This application claims priority under 35 U.S.C. § 119 from Korean Patent Application No. 10-2017-0071630 filed on Jun. 8, 2017, in the Korean Intellectual Property Office, the disclosure of which is incorporated herein by reference in its entirety.

BACKGROUND

1. Field

Apparatus consistent with the disclosure relates to a display device for visually providing various images for the user.

2. Discussion of Related Art

Display devices refer to devices equipped with a means to display images and are thus capable of displaying various visual images.

The liquid crystal display (LCD) is currently one of the most widely used flat panel displays (FPDs), which includes two plates on which electrodes are formed and a liquid crystal layer interleaved between the two plates.

The LCD device is a display device to regulate the amount of transmitted light by applying voltage across the two electrodes to rearrange liquid crystal molecules in the liquid crystal layer. For this, the LCD device requires a backlight unit to provide light. It also requires a color filter to create colors from light transmitted through the liquid crystal layer.

Recently, with the development of quantum dot material technologies, researches on a color conversion technique using blue light of a short wavelength are under way. For example, studies on a technique of increasing color purity of the backlight unit by using a sheet to which the quantum dot technology is applied, and a technique that substitutes a color filter to increase the efficiency and viewing angle, etc., are being conducted.

SUMMARY

The disclosure provides a display device to realize an image by a display panel having a quantum rod layer. Specifically, the disclosure provides a display device with a quantum rod layer and a reflective polarizing plate applied to the display panel.

The disclosure also provides a display device having an optical cavity structure with a quantum rod layer interleaved between a plurality of reflective polarizing plates.

In accordance with an aspect of the disclosure, there is provided a display device including a light source generating light, a lightguide plate configured to change a path of the light generated from the light source and output the light toward a front surface of the display device, a first polarizing plate arranged on the lightguide plate and configured to generate first polarized light, a liquid crystal panel arranged on the first polarizing plate and configured to display an image by using the first polarized light, a second polarizing plate arranged on the liquid crystal panel and configured to generate second polarized light, and a quantum rod layer arranged on the second polarizing plate, divided into a plurality of pixels, and containing quantum rods in at least one of the plurality of pixels, wherein a polarizing axis of the second polarized light is perpendicular to a polarizing axis of polarized light emitted by the quantum rod.

The display device may further include a third polarizing plate arranged on the quantum rod layer and configured to generate third polarized light.

The third polarizing plate may include a reflective polarizing plate.

The display device, wherein a polarizing axis of the third polarized light may be parallel to the polarizing axis of polarized light emitted by the quantum rod layer.

The display device may further include a color filter arranged on the third polarizing plate.

The plurality of pixels may include a first pixel containing first quantum rods to convert incident light to light of a preset first wavelength, and a second pixel containing second quantum rods to convert incident light to light of a preset second wavelength.

The plurality of pixels may further include a third pixel including an optical retarder to delay a wavelength of the incident light by an odd multiple of the half wavelength.

The quantum rod layer may be formed in a pixel patterning method.

The display device may further include a color filter arranged of the quantum rod layer.

The display device may further include a polarizing plate configured to reduce reflection including a light absorption material and arranged on the quantum rod layer.

The display device, wherein a polarizing axis of the polarizing plate configured to reduce reflection may be parallel to a polarizing axis of light emitted by the quantum rod layer.

The display device, wherein the light source may be configured to generate light of a preset third wavelength.

The light source may be configured to generate blue light, and wherein the quantum rod layer may be configured to convert the blue light generated from the light source to at least one of red light, green light, and blue light.

The display device may further include a third polarizing plate arranged between the quantum rod layer and the polarizing plate configured to reduce reflection, the third polarizing plate configured to generate third polarized light.

The display device may further including a color filter arranged between the quantum rod layer and the third polarizing plate.

The quantum rod layer may be divided into a plurality of pixels including a first pixel containing first quantum rods to convert incident light to light of a preset first wavelength, and a second pixel containing second quantum rods to convert incident light to light of a preset second wavelength.

The plurality of pixels may further include a third pixel including an optical retarder to delay a wavelength of the incident light by an odd multiple of the half wavelength.

BRIEF DESCRIPTION OF THE DRAWINGS

The above and other objects, features and advantages of certain embodiments of the disclosure will become more apparent from the following description taken in conjunction with the accompanying drawings, in which:

FIG. 11 shows a light path in the quantum rod layer of FIG. 8;

FIG. 13 shows a structure and operating principle of a display device according to an embodiment.

DETAILED DESCRIPTION

Figure 1:
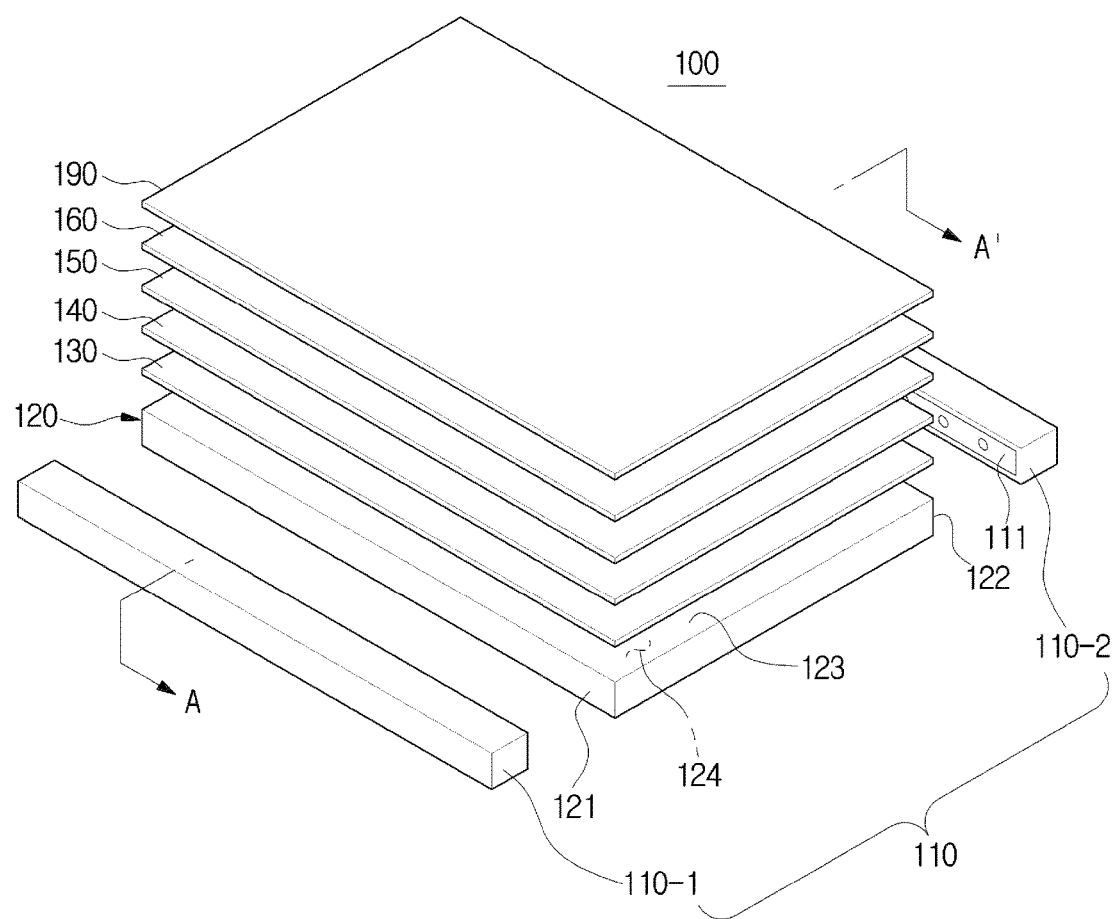
FIG. 1 is a perspective view of a display device according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example, however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise. Expressions such as "at least one of" and "at least one selected from" when preceding a list of elements, modify the entire list of elements and do not modify the individual elements of the list. For example, "at least one selected from a, b, and c," should be understood as including only a, only b, only c, both a and b, both a and c, both b and c, or all of a, b, and c.

Figure 2:
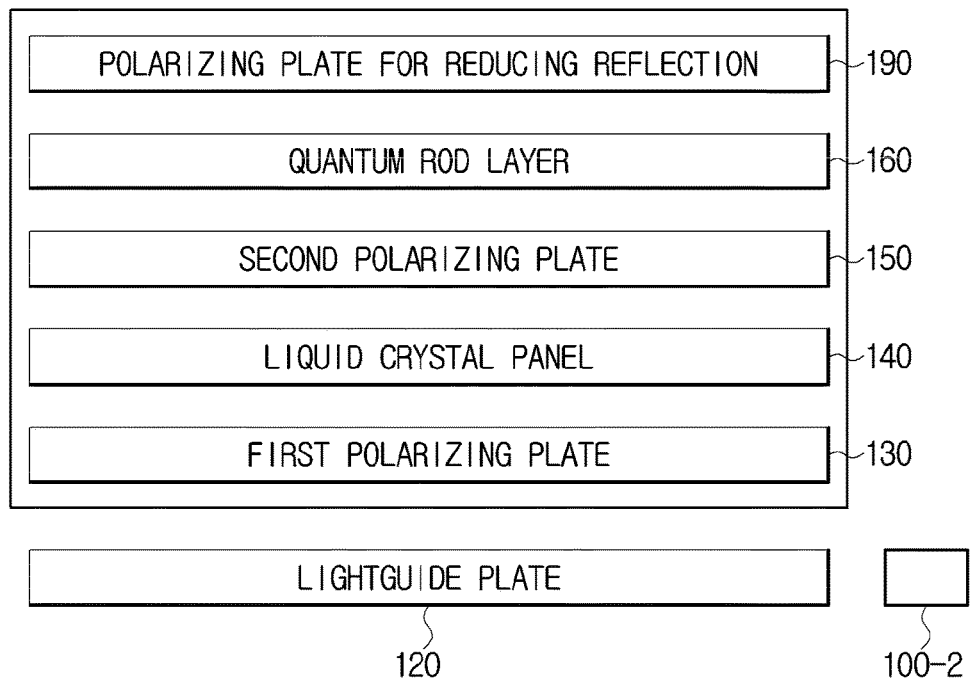
FIG. 2 is a cross-sectional view of the display device of FIG. 1, which is cut in AA' direction.

FIG. 1 is a perspective view of a display device 100 according to an embodiment, and FIG. 2 is a cross-sectional view of the display device 100 of FIG. 1, which is cut in AA' direction.

Referring to FIGS. 1 and 2, the display device 100 includes a light source 110 for generating light, a lightguide plate 120 for changing the path of the generated light and outputting the light, a first polarizing plate 130 mounted on the top of the lightguide plate 120, a liquid crystal panel 140 mounted on the top of the first polarizing plate 130, a second polarizing plate 150 mounted on the top of the liquid crystal panel 140, a quantum rod layer 160 mounted on the top of the second polarizing plate 150, and a polarizing plate for reducing reflection 190 mounted on the top of the quantum rod layer 160.

The light source 110 may include at least one light source. FIG. 1 illustrates an embodiment where the light source 110 includes a first light source 110-1 and a second light source 110-2. Each light source 110 may be arranged on a side of the transparent lightguide plate 120 in the form of an array of dot light sources, and the light generated by the light source may enter the lightguide plate 120 through the side of the lightguide plate 120.

The light source 110 may generate light of a preset third wavelength, the light of the third wavelength including blue light having a wavelength band ranging from about 380 nm to about 492 nm. In the following description, the light generated by the light source 110 may be blue light. The types of the light source 110 include, for example, a light emitting diode (LED), an organic light emitting diode (OLED), etc., without being limited thereto.

The light source 110 may further include a light source cover 111 in a structure with one side open. The light source cover 111 may reflect the light generated from the light source array to the open side, and as a result, the light generated from the light source array may be transmitted to the lightguide plate 120 through the open side.

The lightguide plate 120 may be shaped as a rectangular plate. The light guide plate 120 may include first and second incident surfaces 121 and 122, on which light is incident, an output surface 123 which connects the first and second incident surfaces 121 and 122 and through which light is output, a reflecting surface 124 connecting the first and second incident surfaces 121 and 122 and opposite to the output surface 123. A pattern may be formed on the reflecting surface 124 to scatter the incident light on the reflecting surface 124.

The first and second incident surfaces 121 and 122 may be defined as the sides of the transparent lightguide plate 120. The first and second incident surfaces 121 and 122 may be located adjacent to the first and second light sources 110-1 and 110-2, respectively, allowing the light generated from the light source 110 to enter the transparent lightguide plate 120.

Although an instance where there are two incident surfaces 121, 122 formed on the lightguide plate 120 is shown in FIG. 1, embodiments are not limited thereto. For example, it is possible that there is only one incident surface or three or more incident surfaces formed on the lightguide plate 120.

The first polarizing plate 130 is located on the top of the lightguide plate 120. The first polarizing plate 130 may generate first polarized light by passing the light output from the output surface 123 of the lightguide plate 120.

The liquid crystal panel 140 may display images using the light output through the lightguide plate 120. Specifically, it may display an image by changing the first polarized light that has been outputted from the lightguide plate 120 and passed through the first polarizing plate 130.

The liquid crystal panel 140 may include an upper plate, a lower plate, and a liquid crystal layer interleaved between the upper plate and the lower plate. Each of the upper and lower plates may be made of glass or a transparent plastic material. One of the upper and lower plates may include multiple thin film transistors (TFTs) arranged thereon in the form of a matrix, and the other plate may include a common electrode formed of indium tin oxide (ITO) or indium zinc oxide (IZO).

The liquid crystal molecules constituting the liquid crystal layer may be positive liquid crystals. The positive liquid crystal is a liquid crystal in which permittivity of the major axis of the liquid crystal molecule is greater than that of the minor axis, and these crystals may exist in a pre-tilted state.

The second polarizing plate 150 may be located on the top of the liquid crystal panel 140. The second polarizing plate 150 may generate second polarized light from the light output from the liquid crystal panel 140.

The polarizing axis of the first polarizing plate 130 and the polarizing axis of the second polarizing plate 150 may be perpendicular to each other. This may reduce or minimize a loss of light that has changed while passing the liquid crystal panel 140, and may improve light efficiency.

The second polarizing plate 150 may be a reflective polarizing plate. In other words, a material easy to reflect light may be applied on at least one surface of the second polarizing plate 150, and in some embodiments, the second polarizing plate 150 itself may be made of a material easy to reflect light.

The quantum rod layer 160 may be located on the top of the second polarizing plate 150. The quantum rod layer 160 may be divided into a plurality of pixels that are formed in a pixel patterning method, and quantum rods may be received in at least one of the pixels.

The quantum rod has a photoluminescence property that emits light by means of incident light onto the quantum rod. The light with a short wavelength, which has passed the second polarizing plate 150, excites the quantum rod, and the light emitted by the quantum rod has a particular polarizing axis according to the arrangement of the quantum rods. For example, the quantum rod may emit polarized light, and the polarizing axis of light emitted from the quantum rod may be controlled by regulating the arrangement of the quantum rods.

Figure 3:
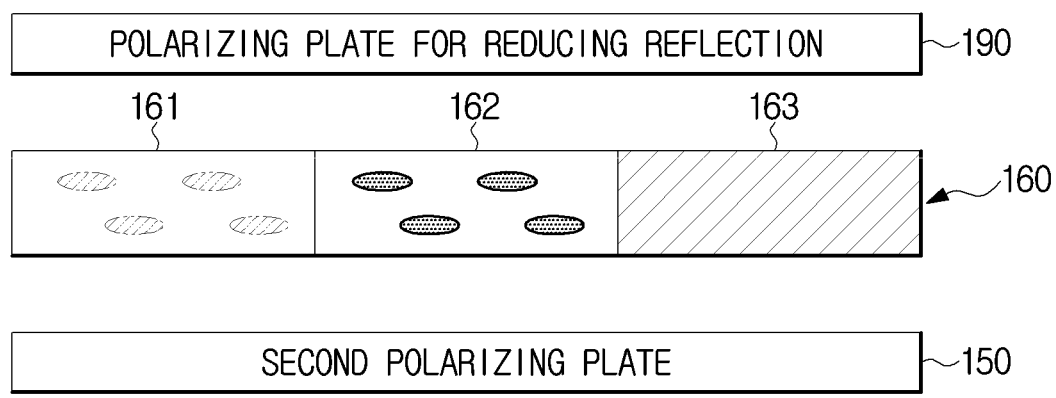
FIG. 3 shows a structure of the quantum rod layer of the display device of FIG. 1.

A structure of the quantum rod layer 160 will now be described in detail with reference to accompanying drawings. FIG. 3 shows an embodiment of the quantum rod layer 160 of the display device 100 of FIG. 1.

Referring to FIG. 3, the quantum rod layer 160 in accordance with an embodiment may be divided into a plurality of pixels including a first pixel 161, a second pixel 162, and a third pixel 163.

Specifically, the first pixel 161 may contain first quantum rods to convert the incident light to light of a preset first wavelength. The light of the first wavelength may include red light having a wavelength band ranging from about 585 nm to about 800 nm, and hereinafter, will be called red light. The blue light generated from the light source 110 may be excited by the first quantum rods, and converted to the red light.

The second pixel 162 may contain second quantum rods to convert the incident light to light of a preset second wavelength. The light of the second wavelength may include green light having a wavelength band ranging from about 492 nm to about 585 nm, and hereinafter, will be called green light. The blue light generated from the light source 110 may be excited by the second quantum rod and converted to the green light.

The third pixel 163 may have an optical retarder for delaying the incident light by an odd multiple of the half wavelength. The blue light of the third wavelength generated from the light source 110 may be delayed by the half wavelength while passing the third pixel 163.

In FIG. 3, an instance where the first pixel 161, the second pixel 162, and the third pixel 163 have the same size and are arranged side by side is shown. The size, type, and form of arrangement of the pixels are not limited thereto, but may include various modifications.

The polarizing plate for reducing reflection 190 may be located on the top of the quantum rod layer 160. The polarizing plate for reducing reflection 190 is configured to prevent or reduce glare that occurs when external light is incident on the surface of the display panel and reflected therefrom, and has the polarizing axis arranged in parallel with the polarizing axis of the quantum rod contained in the quantum rod layer 160.

In the disclosure, with the parallel arrangement of the polarizing axes of the polarizing plate for reducing reflection 190 and the quantum rod, the light emitted from the quantum rod layer 160 may be more efficiently output to the front surface of the display panel, and as a result, the light efficiency of the display panel may be improved.

Figure 4:
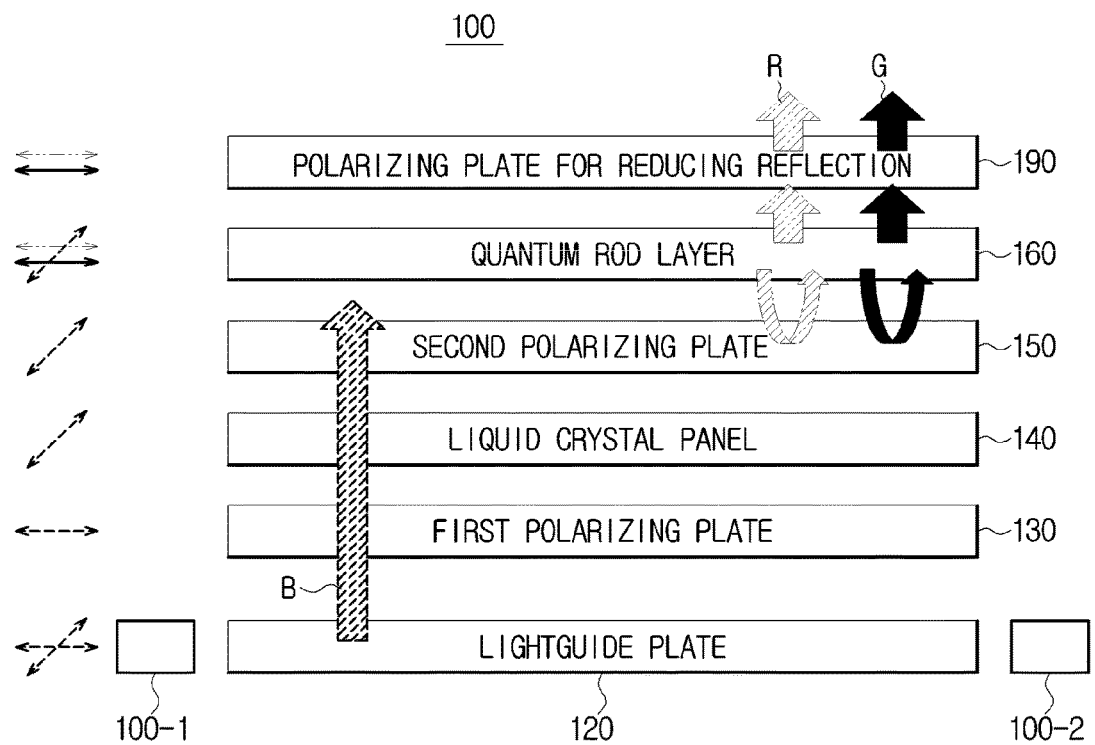
FIG. 4 shows a light path in the display device of FIG. 1.
Figure 5:
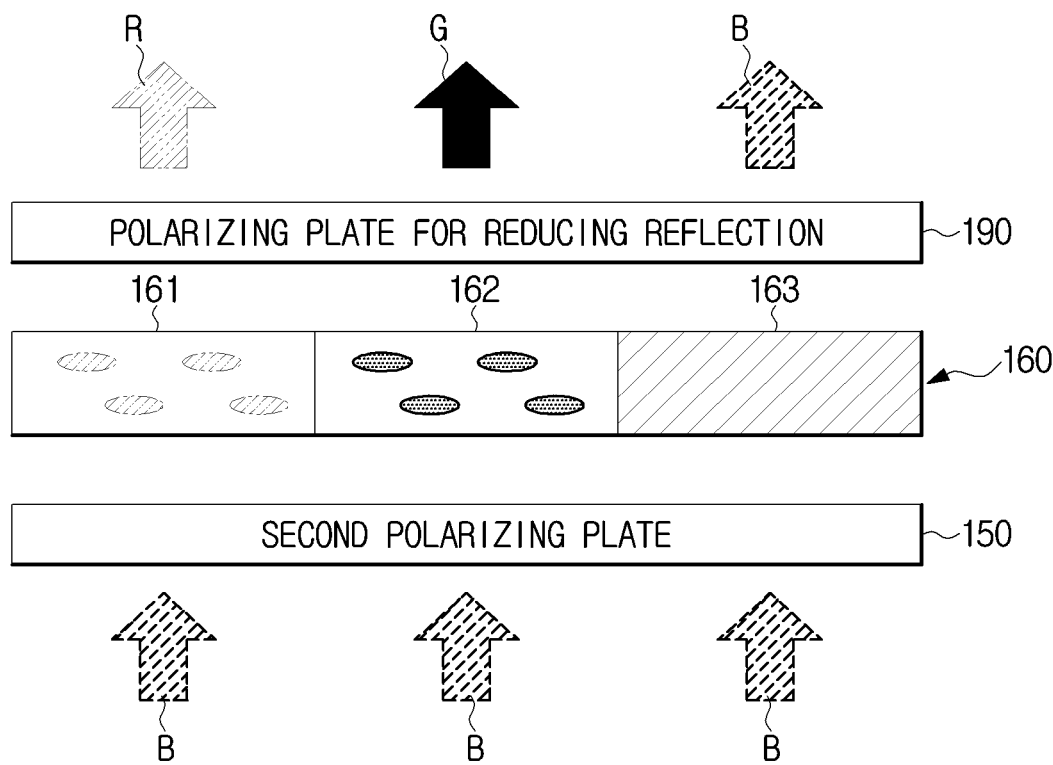
FIG. 5 shows a light path in the quantum rod layer of FIG. 4.
Figure 6:
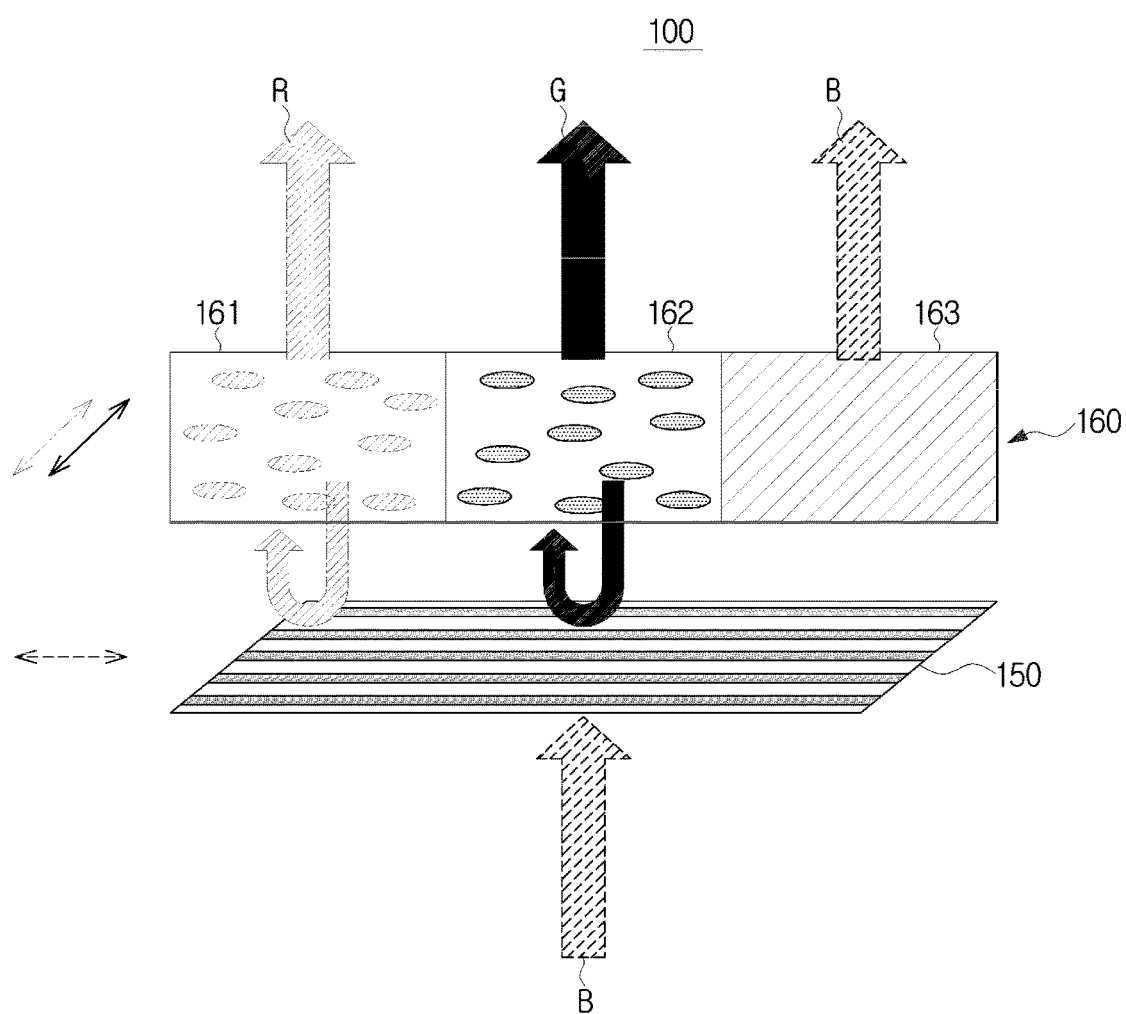
FIG. 6 shows a path of the light reflected by the second polarizing plate of FIG. 4.

FIGS. 4 to 6 show an operating principle of the display device 100 of FIG. 1. Specifically, FIG. 4 shows a light path in the display device 100 of FIG. 1, FIG. 5 shows a light path in the quantum rod layer 160 of FIG. 4, and FIG. 6 shows a path of the light reflected by the second polarizing plate 150.

Referring to FIG. 4, the blue light B generated from the light source 110 first passes the lightguide 120 and is output toward the front surface of the display panel.

The blue light B output toward the front surface of the display panel is converted to the first polarized light while passing the first polarizing plate 130.

The blue light B converted to the first polarized light is output to the front surface of the display panel with the polarizing axis changed while passing the liquid crystal panel 140.

The light output from the liquid crystal panel 140 is converted to the second polarized light while passing the second polarizing plate 150, and the second polarized light enters the quantum rod layer 160.

Referring to FIG. 5, some of the second polarized rays, which enter the first pixel 161 of the quantum rod layer 160, are converted to red light R while passing the first quantum rod. Some of the second polarized rays, which enter the second pixel 162 of the quantum rod layer 160, are converted to green light G while passing the second quantum rod. Furthermore, some of the second polarized rays entering the third pixel 163 of the quantum rod layer 160 are converted to the light delayed by the half wavelength by the optical retarder contained in the third pixel 163.

The red light R and the green light G emitted from the first pixel 161 and the second pixel 162 are emitted in the form of polarized light having a polarizing axes perpendicular to the polarizing axis of the second polarized light according to the arrangement of the quantum rods.

In the disclosure, by controlling the arrangement of the quantum rods such that the polarizing axis of the light emitted from the quantum rod is perpendicular to the polarizing axis of the second polarizing plate 150, some of the rays emitted from the quantum rods, which proceed to the rear surface of the display device 100, are not transmitted through the second polarizing plate 150 but reflected back to the front surface of the display device 100.

Referring to FIG. 6, some of the red light R and the green light G emitted from the first pixel 161 and the second pixel 162 may proceed to the rear surface of the display device 100, i.e., to the second polarizing plate 150. In this case, since the polarizing axes of the red light R and the green light G are perpendicular to the polarizing axis of the second polarizing plate 150, the light proceeding toward the second polarizing plate 150 may be reflected back and may come to the front surface of the display device 100.

Furthermore, in the disclosure, with the optical retarder structure installed in the third pixel 163, the wavelength of the blue light B entering the third pixel 163 is delayed by the half wavelength. In this way, by making the polarizing axes of the red light R and the green light G emitted from the first pixel 161 and the second pixel 162 correspond to the polarizing axis of the blue light B emitted from the third pixel 163, the blue light B entering the third pixel 163 may be effectively used.

Figure 7:
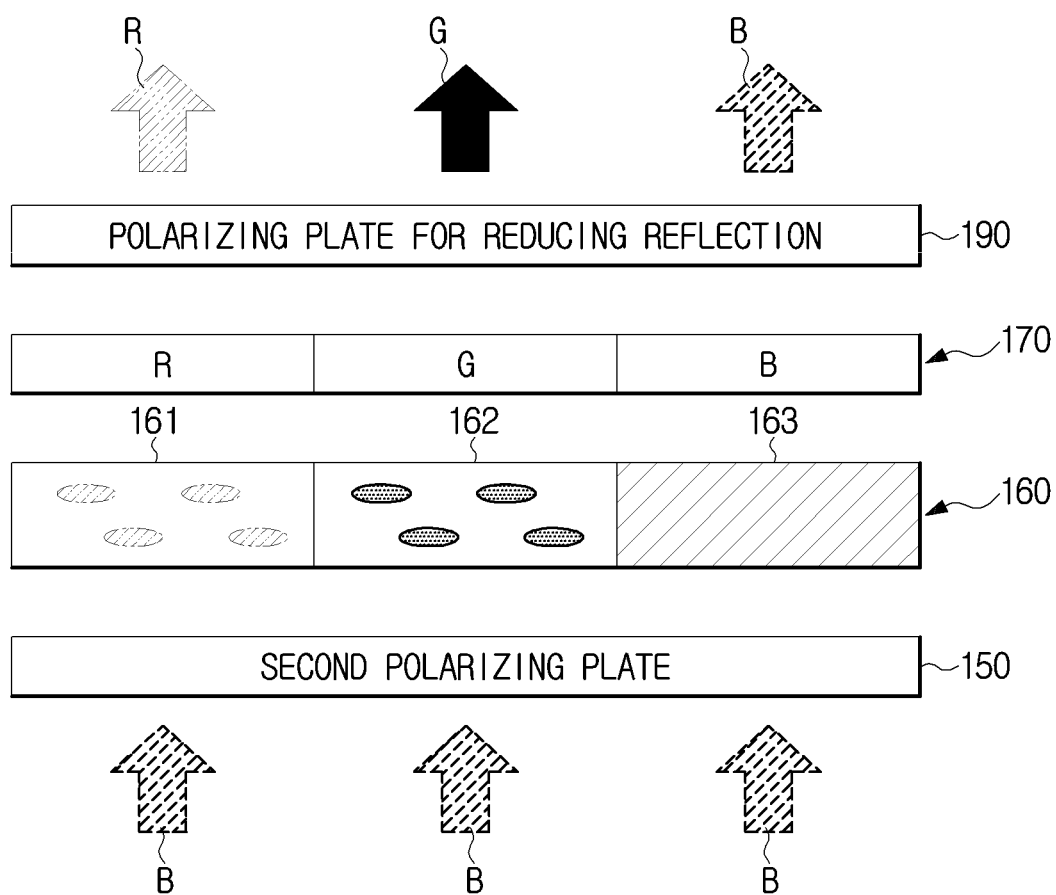
FIG. 7 shows a structure and operating principle of a display device according to an embodiment.

FIG. 7 shows a structure and operating principle of a display device 100a, according to an embodiment. In FIG. 7, different parts from the display device 100 as described above in connection with FIGS. 1 and 2 will be mainly focused for convenience.

Referring to FIG. 7, the display device 100a is similar to the display device 100 shown in FIGS. 1 and 2 except that an RGB color filter 170 is further arranged on the top of the quantum rod layer 160.

The display device 100 shown in FIGS. 1 and 2 creates white light by converting blue light B to red light R and green light G by using quantum rods, in which case some non-converted blue light B, if they are output onto the front surface of the display panel, may make it more difficult to realize clear colors.

The RGB color filter 170 may be additionally installed on the top of the quantum rod layer 160 to realize clearer colors.

Figure 8:
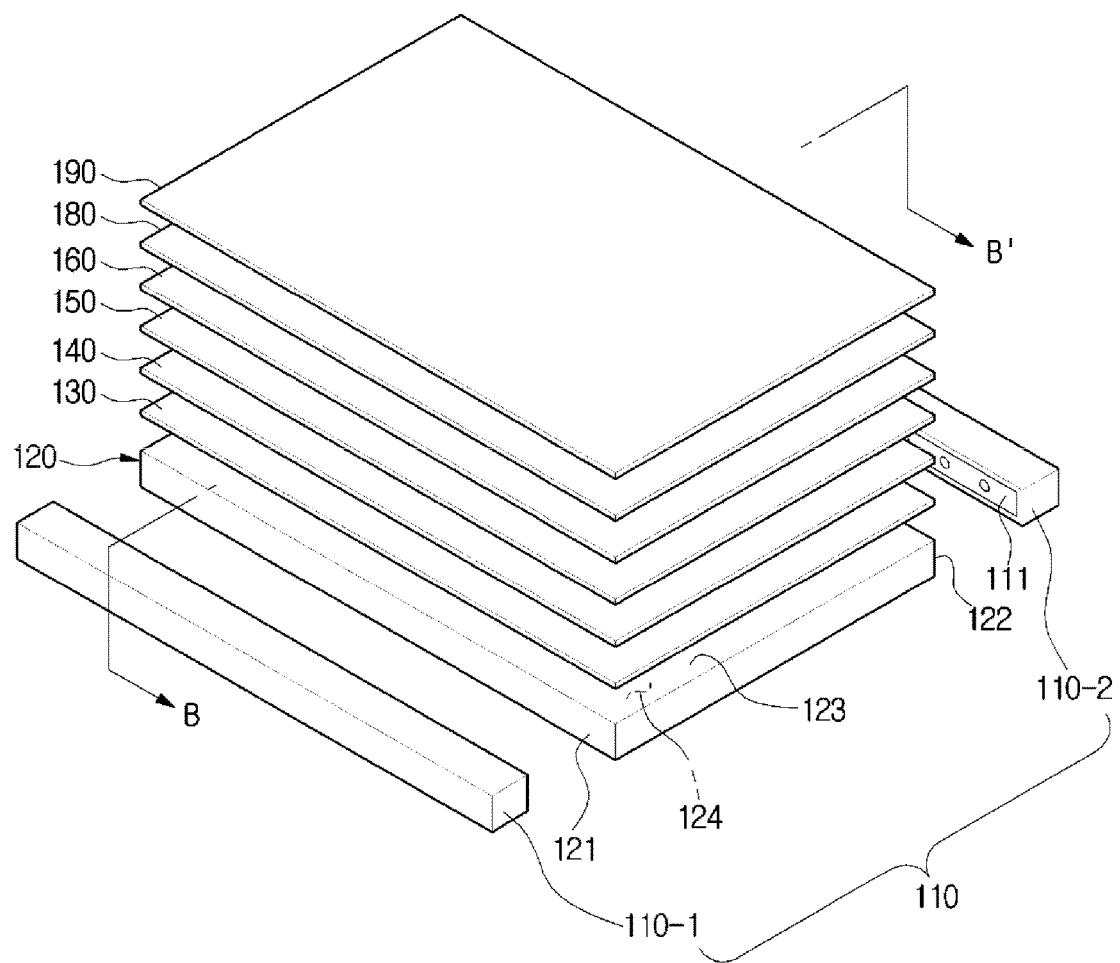
FIG. 8 shows a structure of a display device according to an embodiment.
Figure 9:
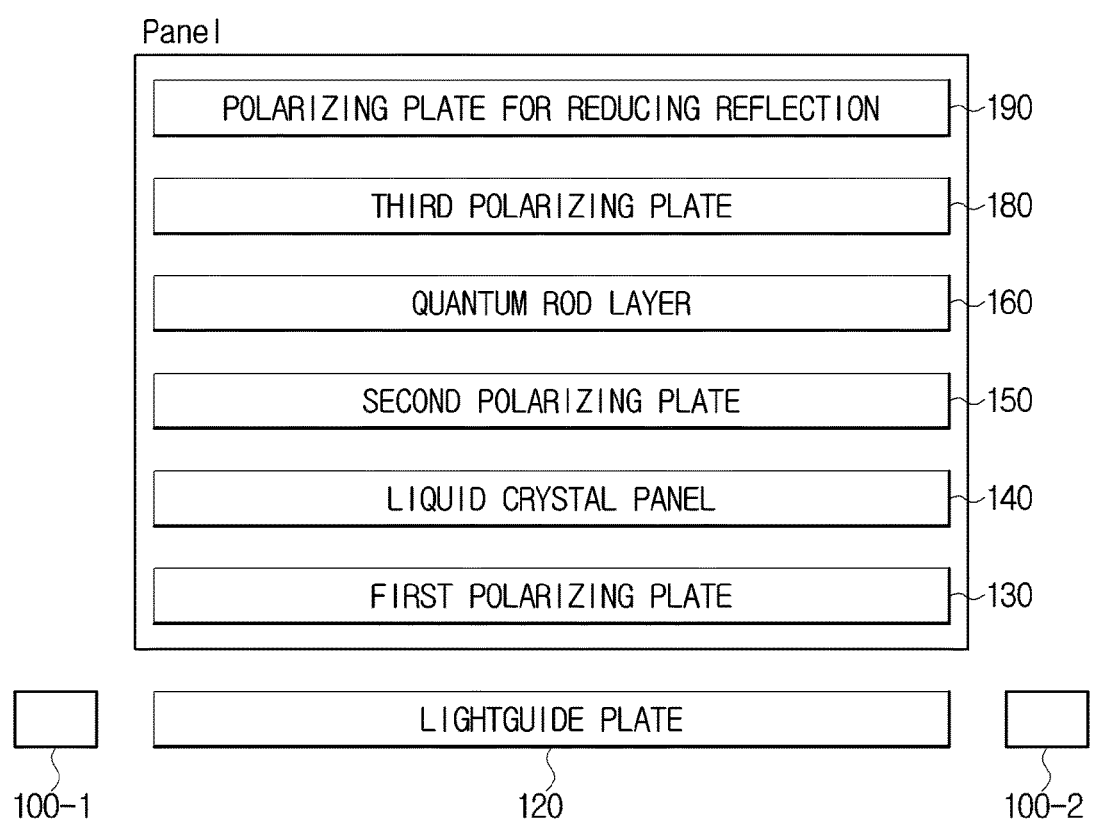
FIG. 9 is a cross-sectional view of the display device of FIG. 8 which is cut in BB' direction.

FIG. 8 shows a structure of a display device 100b, according to an embodiment, and FIG. 9 is a cross-sectional view of the display device 100b, which is cut in BB' direction.

Referring to FIGS. 8 and 9, the display device 100b includes the light source 110 for generating light, the lightguide plate 120 for changing the path of the generated light and outputting the light, the first polarizing plate 130 mounted on the top of the lightguide plate 120, the liquid crystal panel 140 mounted on the top of the first polarizing plate 130, the second polarizing plate 150 mounted on the top of the liquid crystal panel 140, the quantum rod layer 160 mounted on the top of the second polarizing plate 150, a third polarizing plate 180 mounted on the top of the quantum rod layer 160, and the polarizing plate for reducing reflection 190 mounted on the top of the third polarizing plate 180.

The light source 110, the lightguide plate 120, the first polarizing plate 130, the liquid crystal panel 140, the second polarizing plate 150, the quantum rod layer 160, and the plate for reducing reflection 190 are the same as what are described above in connection with FIGS. 1 and 2, so the description thereof will not be repeated hereinafter.

Referring to FIGS. 8 and 9, the display device 100b has the second polarizing plate 150 arranged underneath the quantum rod layer 160 and the third polarizing plate 180 arranged on the top of the quantum rod layer 160. Both the second and third polarizing plates 150 and 180 may be a reflective polarizing plate, and the polarizing axis of the third polarizing plate 180 may be perpendicular to the polarizing axis of the second polarizing plate 150.

The third polarizing plate 180 permits transmission of preset third polarized light. The polarizing axis of the third polarizing plate 180 may be arranged to be parallel to the polarizing axis of the polarized light emitted by the quantum rod. Specifically, the polarizing axis of the third polarizing plate 180 may be arranged to be parallel to the polarizing axes of the red light R and the green light G emitted by the quantum rods.

The display device 100b in accordance with the embodiment may promote light recycling effect with a light cavity structure in which the quantum rod layer 160 is arranged between two reflective polarizing plates that are perpendicular to each other, as described above. When the optical cavity structure is implemented, the quantum rod layer 160 may be made thinner and light efficiency may be improved.

Figure 10:
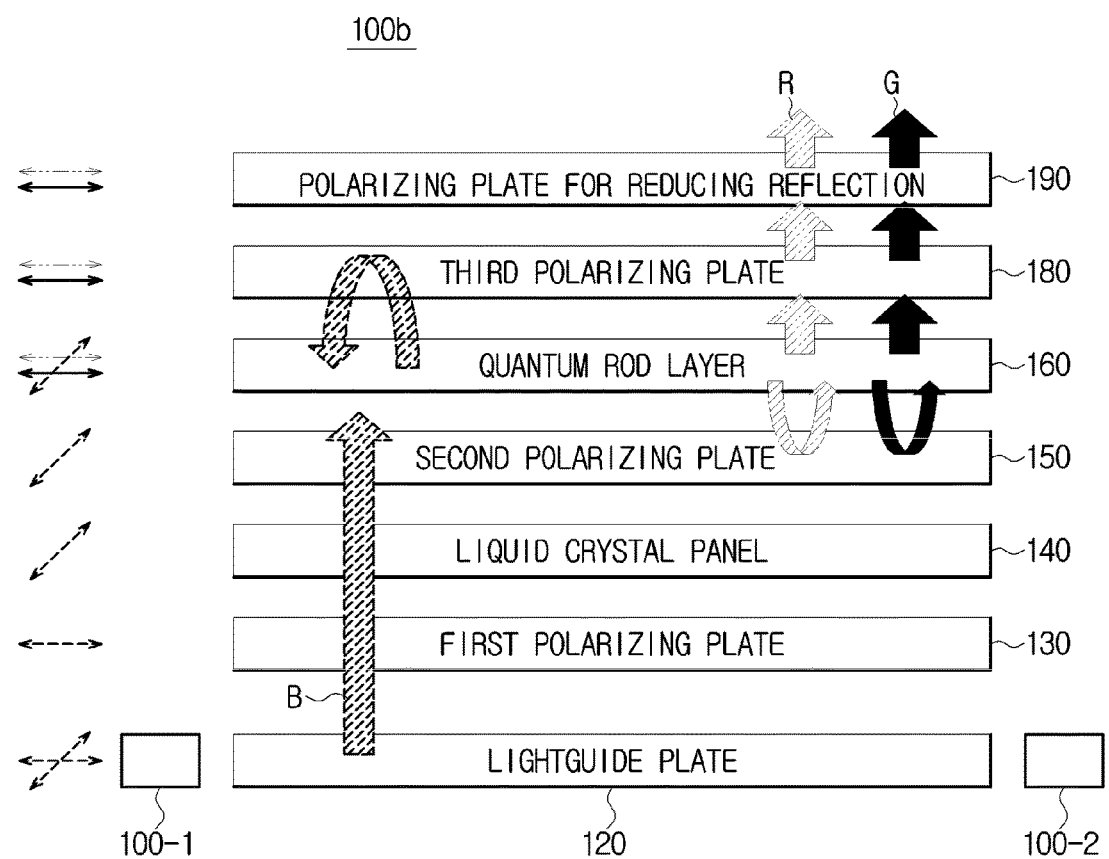
FIG. 10 shows a light path in the display device of FIG. 8.
Figure 12:
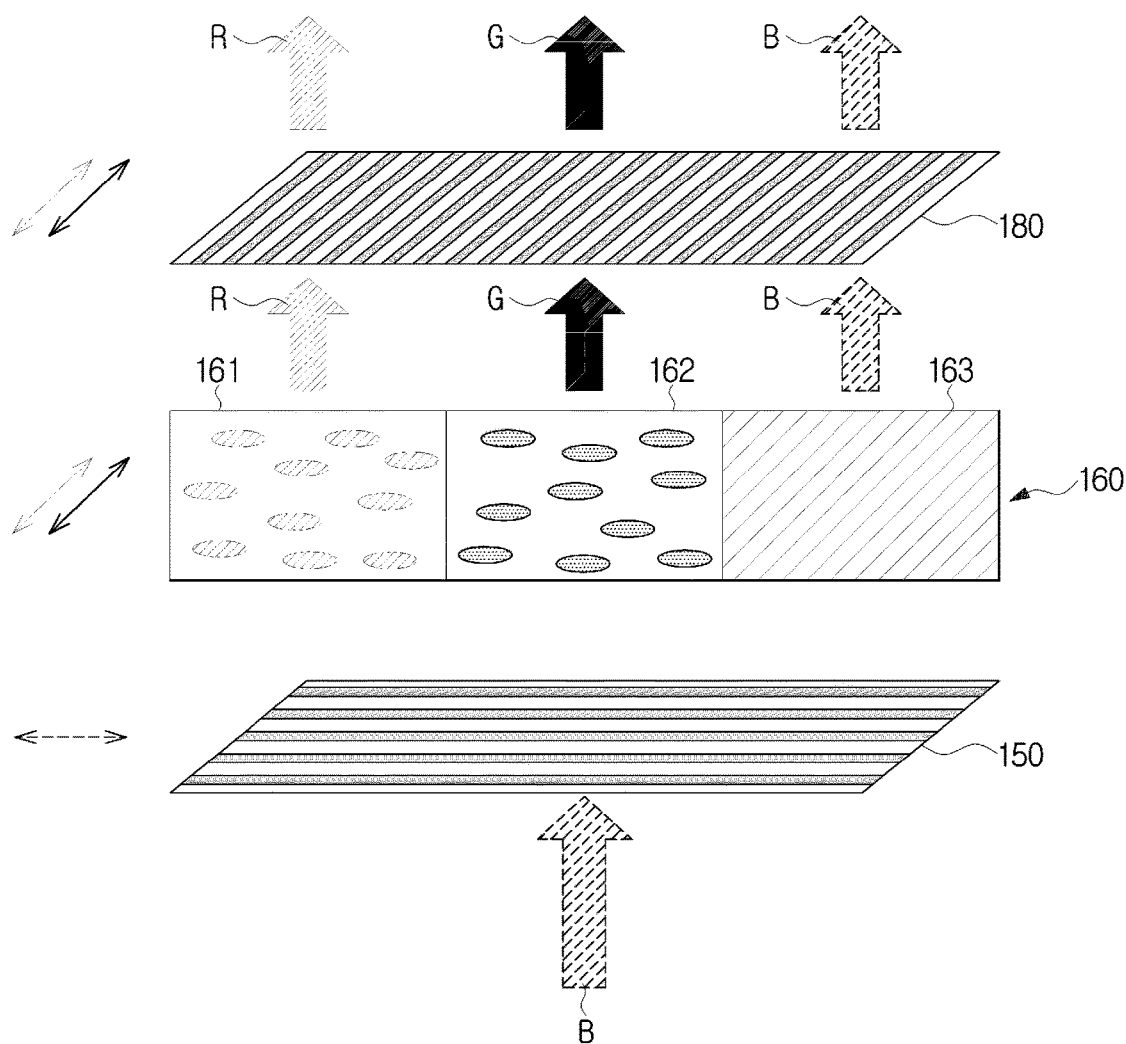
FIG. 12 shows a light path between the second polarizing plate and the third polarizing plate of FIG. 8.

FIGS. 10 to 12 show an operating principle of the display device 100b shown in FIGS. 8 and 9. Specifically, FIG. 10 shows a light path in the display device 100b of FIG. 8, FIG. 11 shows a light path in the quantum rod layer 160 of FIG. 8, and FIG. 12 shows a light path between the second polarizing plate 150 and the third polarizing plate 180.

Referring to FIG. 10, the blue light B generated from the light source 110 first passes the lightguide 120 and is output toward the front surface of the display panel 100b.

The light output toward the front surface of the display panel 100b is converted to the first polarized light while passing the first polarizing plate 130.

The blue light B converted to the first polarized light is output to the front surface of the display panel 100b with the polarizing axis changed while passing the liquid crystal panel 140.

The light output from the liquid crystal panel 140 is converted to the second polarized light while passing the second polarizing plate 150, and the second polarized light enters the quantum rod layer 160.

Referring to FIG. 11, some of the second polarized rays, which enter the first pixel 161 of the quantum rod layer 160, are converted to red light R while passing the first quantum rod. Some of the second polarized rays, which enter the second pixel 162 of the quantum rod layer 160, are converted to green light G while passing the second quantum rod. Furthermore, some of the second polarized rays entering the third pixel 163 of the quantum rod polarizing filter are converted to the light delayed by the half wavelength by the optical retarder contained in the third pixel 163.

At this time, some of the blue light B entering the first pixel 161 or the second pixel 162 may fail to be converted to the red light R or the green light G. In this case, the remaining blue light B may inadvertently be emitted to the front surface, degrading color sharpness of an image to be realized on the display device 100b.

In the disclosure, the third polarizing plate 180, which is a reflective polarizing plate, is additionally arranged on the top of the quantum rod layer 160 as shown in FIG. 12, so that some of the blue light B, which passed the second polarizing plate 150 but remain unconverted by the quantum rod layer 160, hit the rear surface of the third polarizing plate 180, change the light path and return to the quantum rod layer 160.

This structure is employed by the display device 100b, enabling the quantum rod layer 160 to be made thinner and improving color reproduction efficiency.

FIG. 13 shows a structure and operating principle of a display device 100c according to an embodiment.

Referring to FIG. 13, a display device 100c is similar to the display device 100b shown in FIGS. 8 and 9 except that the RGB color filter 170 is arranged on the top of the third polarizing plate 180.

The display device 100c has the additional RGB color filter 170 installed on the top of the quantum rod layer 160 to realize clearer colors.

According to embodiments of the disclosure, a display device may have a reflective polarizing plate applied on a quantum rod layer (on the rear surface of the quantum rod layer) to reduce an efficiency degradation problem that arises from backscattering occurring when a quantum dot color filter is used.

Furthermore, the display device may improve color conversion efficiency of the quantum rod layer by employing an optical cavity structure.

Consequently, a display device may have improved properties of transmittance, viewing angle, color reproducibility, etc.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A display device comprising:
a light source generating light;
a lightguide plate configured to change a path of the light generated from the light source and output the light toward a front surface of the display device;
a first polarizing plate arranged on the lightguide plate and configured to generate first polarized light;
a liquid crystal panel arranged on the first polarizing plate and configured to display an image by using the first polarized light;
a second polarizing plate arranged on the liquid crystal panel and configured to generate second polarized light; and
a quantum rod layer arranged on the second polarizing plate, contacted with the second polarizing plate, divided into a plurality of pixels, and containing quantum rods in at least one of the plurality of pixels,
wherein a polarizing axis of the second polarized light is perpendicular to a polarizing axis of polarized light emitted by the quantum rod layer.

2. The display device of claim 1, further comprising a third polarizing plate arranged on the quantum rod layer and configured to generate third polarized light.

3. The display device of claim 2, wherein the third polarizing plate comprises a reflective polarizing plate.

4. The display device of claim 3, wherein a polarizing axis of the third polarized light is parallel to the polarizing axis of polarized light emitted by the quantum rod layer.

5. The display device of claim 3, further comprising a color filter arranged on the third polarizing plate.

6. The display device of claim 1, wherein the plurality of pixels comprises:
a first pixel containing first quantum rods to convert incident light to light of a preset first wavelength; and
a second pixel containing second quantum rods to convert incident light to light of a preset second wavelength.

7. The display device of claim 6, wherein the plurality of pixels further comprises:
a third pixel comprising an optical retarder to delay a wavelength of the incident light by an odd multiple of half wavelength.

8. The display device of claim 1, wherein the quantum rod layer is formed in a pixel patterning method.

9. The display device of claim 1, further comprising a color filter arranged the quantum rod layer.

10. The display device of claim 1, further comprising a polarizing plate configured to reduce reflection comprising a light absorption material and arranged on the quantum rod layer.

11. The display device of claim 10, wherein a polarizing axis of the polarizing plate configured to reduce the reflection is parallel to a polarizing axis of light emitted by the quantum rod layer.

12. The display device of claim 1, wherein the light source is configured to generate light of a preset third wavelength.

13. The display device of claim 1, wherein the light source is configured to generate blue light, and
wherein the quantum rod layer is configured to convert the blue light generated from the light source to at least one of red light, green light, and blue light.

14. The display device of claim 10, further comprising a third polarizing plate arranged between the quantum rod layer and the polarizing plate configured to reduce the reflection, the third polarizing plate configured to generate third polarized light.

15. The display device of claim 14, further comprising a color filter arranged between the quantum rod layer and the third polarizing plate.

16. The display device of claim 15, wherein the plurality of pixels comprises:
a first pixel containing first quantum rods to convert incident light to light of a preset first wavelength; and
a second pixel containing second quantum rods to convert incident light to light of a preset second wavelength.

17. The display device of claim 16, wherein the plurality of pixels further comprises:

a third pixel comprising an optical retarder to delay a wavelength of the incident light by an odd multiple of half wavelength.

\* \* \* \* \*